(12) United States Patent
Neuenschwander et al.

(10) Patent No.: US 9,479,034 B2
(45) Date of Patent: Oct. 25, 2016

(54) CONTINUOUSLY FORMED ANNULAR LAMINATED ARTICLE AND METHOD FOR ITS MANUFACTURE

(71) Applicant: L. H. CARBIDE CORPORATION, Fort Wayne, IN (US)

(72) Inventors: Thomas Neuenschwander, Fort Wayne, IN (US); Barry A. Lee, Fort Wayne, IN (US); Trevor Hirst, N. Swindon (GB)

(73) Assignee: L.H. Carbide Corporation, Fort Wayne, IN (US)

( * ) Notice: Subject to any disclaimer, the term of this patent is extended or adjusted under 35 U.S.C. 154(b) by 319 days.

(21) Appl. No.: 14/304,417

(22) Filed: Jun. 13, 2014

(65) Prior Publication Data

US 2014/0290043 A1 Oct. 2, 2014

Related U.S. Application Data

(62) Division of application No. 13/212,529, filed on Aug. 18, 2011, now Pat. No. 8,786,158.

(60) Provisional application No. 61/375,159, filed on Aug. 19, 2010.

(51) Int. Cl.
*H01F 3/00* (2006.01)
*H02K 15/095* (2006.01)
(Continued)

(52) U.S. Cl.
CPC ............ *H02K 15/095* (2013.01); *H02K 1/148* (2013.01); *H02K 15/022* (2013.01); *Y10T 29/49009* (2015.01); *Y10T 29/49078* (2015.01)

(58) Field of Classification Search
CPC .................. Y10T 20/49009; Y10T 29/49073; Y10T 29/49078; H02K 1/148; H02K 15/022; H02K 15/095
USPC ......................................... 29/596, 606, 609; 310/216.042–216.044
See application file for complete search history.

(56) References Cited

U.S. PATENT DOCUMENTS 2,433,660 A * 12/1947 Granfield ................. H02K 1/16
29/609
2,790,098 A 4/1957 Einart
(Continued)

FOREIGN PATENT DOCUMENTS

JP 5184106 A 7/1993

OTHER PUBLICATIONS

Article—"A New Core", An innovative core structure and manufacturing method boosts efficiency of permanent-magnet motors, IEEE Industry Applications Magazine, Nov./Dec. 2005.

*Primary Examiner* — Thanh Lam
(74) *Attorney, Agent, or Firm* — Faegre Baker Daniels LLP

(57) ABSTRACT

An apparatus and method for the production of relatively large diameter annular components, such as stator cores for electric motors, without excessive waste of material. In one embodiment, a first progressive die assembly forms a plurality of identical pole pieces each made of a plurality of individual stacked and interlocked laminations. The pole pieces, having protruding end portions, are loaded into a rotary carousel. A second progressive die assembly forms a continuous strip including a plurality of body segments connected via hinge portions disposed adjacent recesses between the body segments that are dimensioned to receive the protruding ends of the pole pieces. As the continuous strip is formed, it is wound about the rotary carousel with progressive pivoting of the body segments about the hinge portions to capture the protruding ends of the pole pieces within the recesses, with continued winding of the strip in a helical fashion around the rotary carousel continuing until a desired height is reached that is substantially equivalent to the height of the pole pieces. The strip is then cut, and the resulting annular part is welded at one or more locations to secure the components together.

8 Claims, 12 Drawing Sheets

(51) Int. Cl.
*H02K 1/14* (2006.01)
*H02K 15/02* (2006.01)

(56) References Cited

U.S. PATENT DOCUMENTS

| | | | |
|---|---|---|---|
| 2,792,511 A | 5/1957 | Horstman | |
| 3,225,424 A | 12/1965 | Wiley | |
| 4,403,489 A | 9/1983 | Munsterman et al. | |
| 4,619,028 A | 10/1986 | Neuenschwander | |
| 4,835,839 A * | 6/1989 | Forbes | D06F 7/304 29/596 |
| 5,241,138 A | 8/1993 | Neuenschwander | |
| 5,349,741 A | 9/1994 | Neuenschwander | |
| 5,918,360 A * | 7/1999 | Forbes | D06F 7/304 29/596 |
| 6,147,431 A | 11/2000 | Asao et al. | |
| 6,163,949 A | 12/2000 | Neuenschwander | |
| 6,226,856 B1 | 5/2001 | Kazama et al. | |
| 6,369,687 B1 | 4/2002 | Akita et al. | |
| 6,448,685 B1 | 9/2002 | Mayer et al. | |
| 6,448,686 B1 | 9/2002 | Dawson et al. | |
| 6,483,221 B1 | 11/2002 | Pawellek et al. | |
| 6,504,284 B1 | 1/2003 | Kazama et al. | |
| 6,550,130 B2 * | 4/2003 | Itoh | H02K 5/141 29/596 |
| 6,583,530 B2 | 6/2003 | Hsu | |
| 6,741,005 B2 | 5/2004 | Vohlgemuth | |
| 6,745,458 B2 | 6/2004 | Neuenschwander | |
| 6,759,785 B2 | 7/2004 | Miyake et al. | |
| 6,784,587 B2 | 8/2004 | Miyake et al. | |
| 6,844,653 B2 * | 1/2005 | Kolomeitsev | H02K 1/148 310/216.082 |
| 6,933,649 B2 | 8/2005 | Fujii et al. | |
| 7,062,841 B2 | 6/2006 | Neuenschwander | |
| 7,111,380 B2 | 9/2006 | Sheeran et al. | |
| 7,185,418 B2 | 3/2007 | Miyake et al. | |
| 7,247,967 B2 | 7/2007 | Ionel et al. | |
| 7,337,531 B2 | 3/2008 | Neuenschwander | |
| 7,340,820 B2 | 3/2008 | Kliman et al. | |
| 7,471,025 B2 | 12/2008 | Sheeran et al. | |
| 7,600,312 B2 | 10/2009 | Lee et al. | |
| 7,676,906 B2 | 3/2010 | Neuenschwander et al. | |
| 7,698,803 B2 | 4/2010 | Mitsui et al. | |
| 7,777,387 B2 | 8/2010 | Nagai et al. | |
| 7,928,627 B2 | 4/2011 | Nagai et al. | |
| 2001/0030486 A1 | 10/2001 | Pinjanowski | |
| 2003/0127933 A1 | 7/2003 | Enomoto et al. | |
| 2004/0051417 A1 | 3/2004 | Yamazaki et al. | |
| 2004/0189136 A1 | 9/2004 | Kolomeitsev et al. | |
| 2005/0146232 A1 | 7/2005 | Yamamoto et al. | |
| 2008/0098587 A1 * | 5/2008 | Mitsui | H02K 1/148 29/598 |
| 2009/0026873 A1 | 1/2009 | Matsuo et al. | |
| 2009/0066183 A1 | 3/2009 | Aramaki et al. | |
| 2009/0146519 A1 | 6/2009 | Myojin | |
| 2009/0195112 A1 | 8/2009 | Chai et al. | |
| 2010/0244617 A1 | 9/2010 | Nobata et al. | |

* cited by examiner

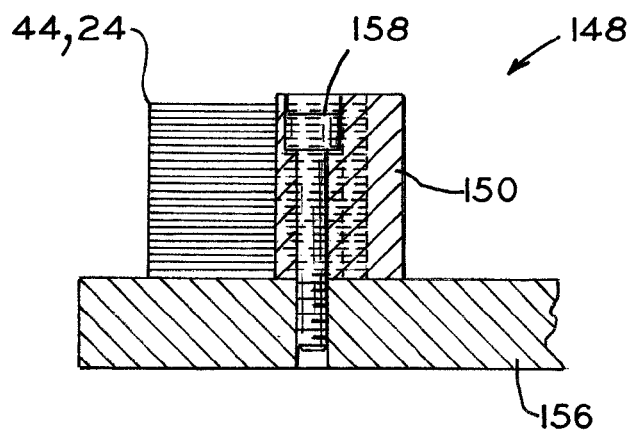
FIG_11
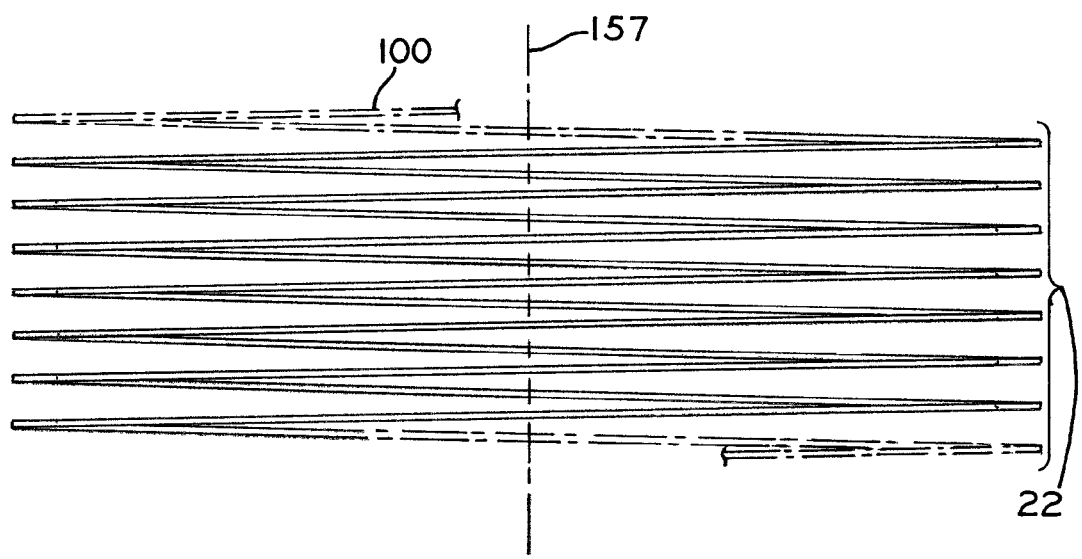
FIG_12

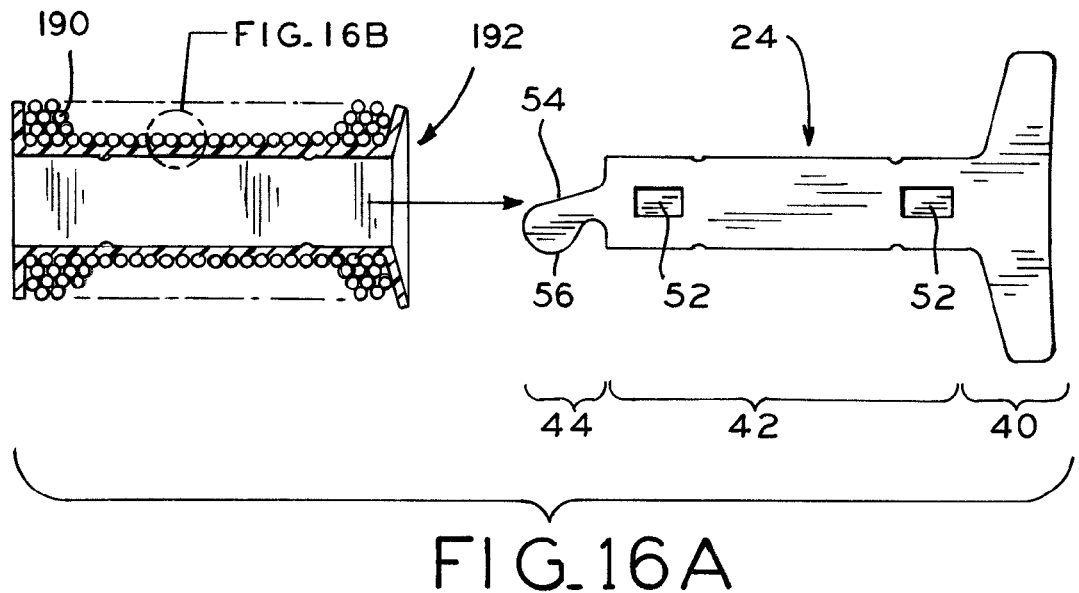
FIG_16A
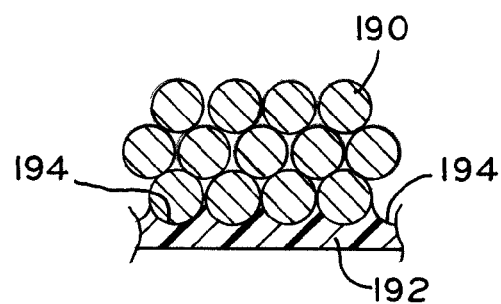
FIG_16B

CONTINUOUSLY FORMED ANNULAR LAMINATED ARTICLE AND METHOD FOR ITS MANUFACTURE

CROSS-REFERENCE TO RELATED APPLICATIONS

This application is a Divisional of U.S. patent application Ser. No. 13/212,529, filed Aug. 18, 2011 entitled CONTINOUSLY FORMED ANNULAR LAMINATED ARTICLE AND METHOD FOR ITS MANUFACTURE, which claims priority under Title 35, U.S.C. §119(e) to U.S. Provisional Patent Application Ser. No. 61/375,159, filed Aug. 19, 2010, entitled CONTINUOUSLY FORMED ANNULAR LAMINATED ARTICLE AND METHOD FOR ITS MANUFACTURE, the entire disclosures of which are hereby expressly incorporated by reference herein.

BACKGROUND

1. Field of Invention

The present invention relates to progressive die assemblies that are used to manufacture relatively large diameter annular components, such as stator cores for electric motors.

2. Description of Related Art

It is well known to manufacture annular laminated parts, such as stator cores, in a manner in which individual annular laminations are stamped from a strip of steel stock material by a progressive die apparatus and are stacked and interlocked to form the part.

However, because each annular lamination is formed as a single piece, the width of the steel strip needs to be at least as large as the outer diameter of the lamination. Thus, disadvantageously, a relatively large amount of the steel material is wasted when manufacturing annular laminated parts via known processes, for example, the material between adjacent laminations and within the interior of each lamination.

In the past, material waste was minimized by manufacturing a rotor core from the central portion of the stator laminations and/or by stamping the stator laminations in rows that were staggered with respect to one another. However, with the use of relatively new electrically commutated motors (ECM), which do not include a rotor core, material waste is much more of a concern as, for example, a central portion of large diameter stator lamination which is stamped as an annular part may remain unused.

A need exists for a high speed die assembly or assemblies capable of creating relatively large diameter annular laminated parts without excessive waste of the stock material from which the annular laminated parts are formed.

SUMMARY

The present disclosure provides an apparatus and method for the production of relatively large diameter annular components, such as stator cores for electric motors, without excessive waste of material. In one embodiment, a first progressive die assembly forms a plurality of identical pole pieces each made of a plurality of individual stacked and interlocked laminations. The pole pieces, having protruding end portions, are loaded into a rotary carousel. A second progressive die assembly forms a continuous strip including a plurality of body segments connected via hinge portions disposed adjacent recesses between the body segments that are dimensioned to receive the protruding ends of the pole pieces. As the continuous strip is formed, it is wound about the rotary carousel with progressive pivoting of the body segments about the hinge portions to capture the protruding ends of the pole pieces within the recesses, with continued winding of the strip in a helical fashion around the rotary carousel continuing until a desired height is reached that is substantially equivalent to the height of the pole pieces. The strip is then cut, and the resulting annular part is welded at one or more locations to secure the components together.

In one form thereof, the present disclosure provides a method of forming an annular article, including the steps of: forming a plurality of pole pieces by forming, stacking, and interlocking a plurality of individual laminations in a first die assembly; loading the plurality of pole pieces onto a rotary carousel; forming a continuous strip in a second die assembly, the continuous strip including a plurality of body segments separated by gaps, the body segments connected via hinge portions; and rotating the carousel with concurrent winding of the strip around the carousel to progressively capture distal ends of the pole pieces within the gaps by pivoting the body segments about the hinge portions.

In another form thereof, the present disclosure provides an annular laminated article, including an annular core portion including a plurality of body segments connected by hinge portions; and a plurality of pole pieces separate from the core portion, each pole piece including an end portion captured between an adjacent pair of body segments.

BRIEF DESCRIPTION OF THE DRAWINGS

The above-mentioned and other features and advantages of this disclosure, and the manner of attaining them, will become more apparent and the invention itself will be better understood by reference to the following descriptions of an embodiment of the invention taken in conjunction with the accompanying drawings, wherein:

FIG. 11 is a fragmentary view of a portion of the rotary carousel assembly of FIG. 10;

FIG. 12 is a schematic, exaggerated view of the helical strip that forms the core of FIG. 1, the core formed via winding the strip around the pole pieces of FIG. 1;

FIG. 16A is an exploded view of a pole piece and a bobbin having electrical windings;

FIG. 16B is a fragmentary view of a portion of the bobbin and windings of FIG. 16A.

Corresponding reference characters indicate corresponding parts throughout the several views. The exemplifications set out herein illustrate exemplary embodiments of the invention, and such exemplifications are not to be construed as limiting the scope of the disclosure in any manner.

DETAILED DESCRIPTION

Figure 1:
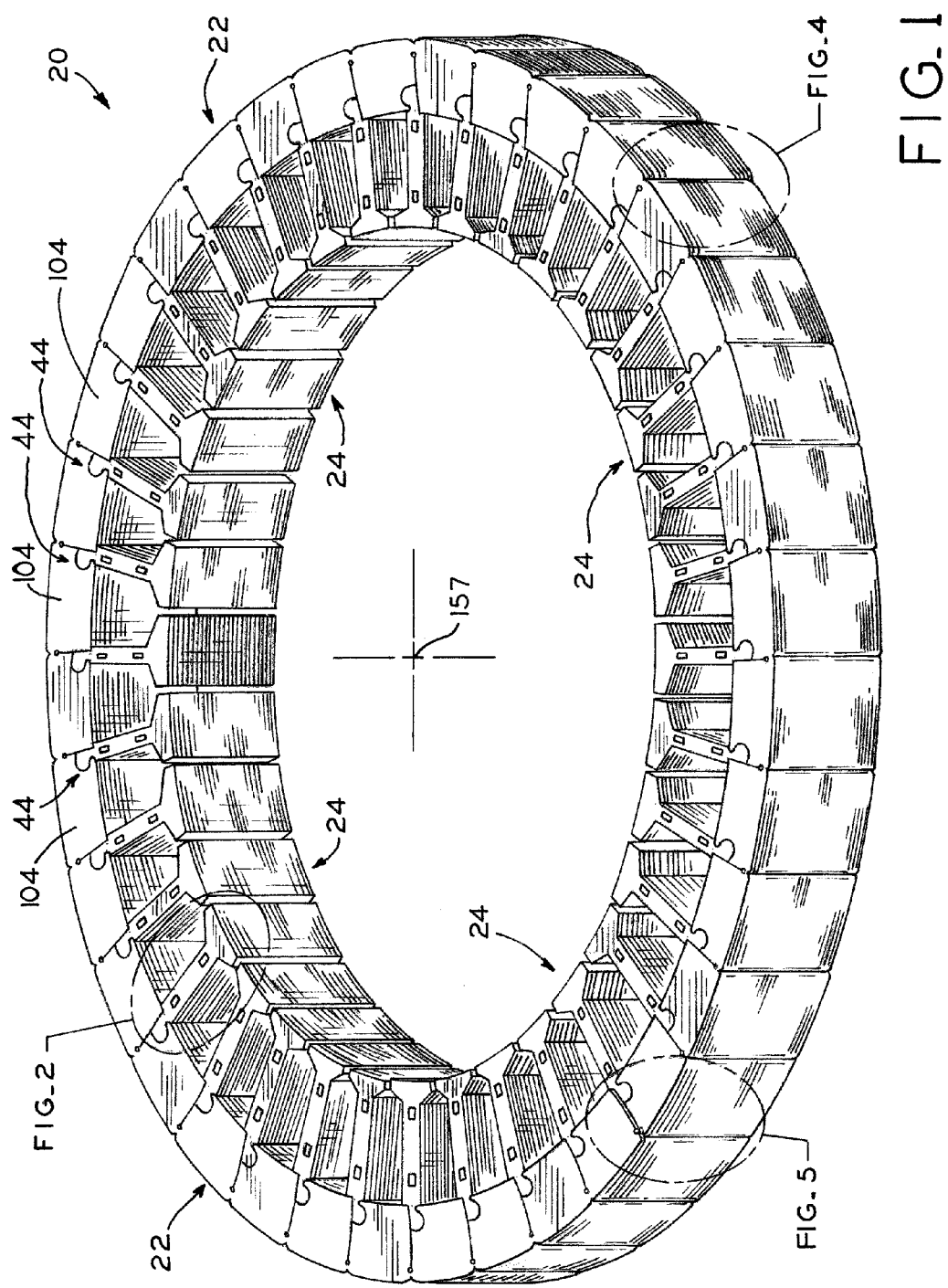
FIG. 1 is a perspective view of an annular laminated article according to an exemplary embodiment, the article including a core and multiple pole pieces.

The present invention provides an apparatus and method for production of a relatively large diameter annular component without excessive waste of material. Referring to FIG. 1, such an annular component is shown as annular laminated article 20 according to an exemplary embodiment. Annular laminated article 20 includes core 22 and multiple pole pieces 24, and may be used as an electric motor stator or in other applications, for example. The present method may be used to produce other types of annular laminated articles, such as rotors for electric motors.

Figure 2:
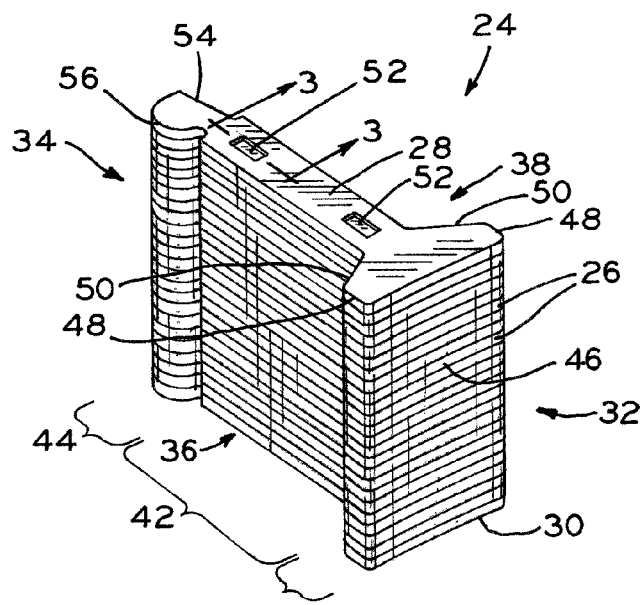
FIG. 2 is a perspective view of an exemplary pole piece of the annular laminated article of FIG. 1.
Figure 3:
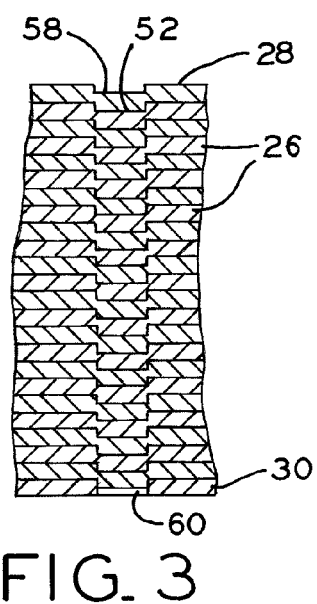
FIG. 3 is a cross-sectional view taken along line 3-3 of FIG. 1 showing the interlocking between individual laminations of the pole piece.

Referring to FIGS. 2 and 3, an exemplary pole piece 24 is shown, which may be manufactured using the die assemblies and methods of the present disclosure. Pole piece 24 includes a plurality of stacked and identical individual laminas 26, which are interlocked with respect to one another in the manner described below. Laminas 26 of pole piece 24 include punched features, and in other embodiments the laminas 26 of a given pole piece 24 may vary in overall shape or profile rather than having identical shapes throughout a given pole piece 24.

Further details regarding lamina stacks including individual lamina layers that may have various outside perimeter shapes and that may have two or more discrete lamina portions, and the manner of manufacturing the same, are described in the above-incorporated U.S. Pat. Nos. 6,163,949 and 7,600,312 to Neuenschwander. Additionally, pole pieces 24 may include different types of laminas, made from different materials, which are formed from two different strips of stock material in the manner described in U.S. Pat. Nos. 7,337,531 and 7,676,906, both assigned to the assignee of the present invention, the disclosures of which are expressly incorporated herein by reference.

Pole piece 24 includes top side 28 defined by an uppermost lamina 26 of pole piece 24, and bottom side 30 defined by a lowermost lamina 26 of pole piece 24. Pole piece 24 further includes front side 32, rear side 34, left side 36, and right side 38, each defined collectively by the peripheral edges of individual laminas 26. The profile of the exemplary pole piece 24, and each individual lamina 26, is generally key-shaped, having proximal or pole piece end portion 40, body portion 42, and a distal protruding end portion 44 which interfaces and is secured with respect to core 22 in the manner described below.

Proximal end portion 40 includes front side 32, which includes substantially planar or arcuate vertical side 46, a first pair of substantially shorter and parallel planar vertical walls 48, and a second pair of angled planar vertical walls 50. Walls 48 extend from wall 46, and walls 50 extend from walls 48, are angled with respect to one another, and connect to elongate inner portion 42.

Body portion 42 has a generally rectangular profile and includes interlock tabs 52. When the annular component is used as a stator, motor windings (not shown) are wound about body portion 42. A second end of body portion 42 connects to distal protruding end portion 44, which has a substantially planar vertical wall 54 adjoining a substantially hemispherically-profiled, arcuate opposite vertical wall 56. Vertical wall 54 is formed by the aligned vertical edges of each lamination of pole piece 24, and hemispherically-profiled wall is formed by the aligned hemisphericaly-profiled edges of each lamination of pole piece 24.

Additionally, as shown in FIGS. 2 and 3, and described further below, each of laminas 26, except for bottom lamina 26 of pole piece 24, includes a plurality of interlock tabs 52 formed therein. Each interlock tab 52 extends slightly outwardly from one side of a lamina to thereby define a corresponding interlock recess 58 in the opposite side of the lamina. Typically, interlock tabs 52 extend from respective sides of their laminas by a distance which is less than the thickness of the stock material from which the laminas are formed. Bottom lamina 26 of pole piece 24 includes a set of apertures 60 punched therein to receive interlock tabs 52 of the next, upper adjacent lamina 26 of pole piece 24 and, other than bottom lamina 26, interlock tabs 52 of each lamina 26 of pole piece 24 interlock into interlock recesses 58 of an adjacent lower lamina to thereby interlock all of laminas 26 of pole piece 24 with one another.

The foregoing interlock arrangement for interlocking laminas in a stack is described in detail in U.S. Pat. Nos. 4,619,028, 5,241,138, 5,349,741, 6,163,949, 6,745,458, and 7,600,312 to Neuenschwander, each assigned to the assignee of the present invention, the disclosure of which are expressly incorporated herein by reference. Although interlock tabs 52, recesses 58, and apertures 60 are shown herein as rectangular in shape, the shape of the same may vary, as discussed in the foregoing patents.

Figure 6:
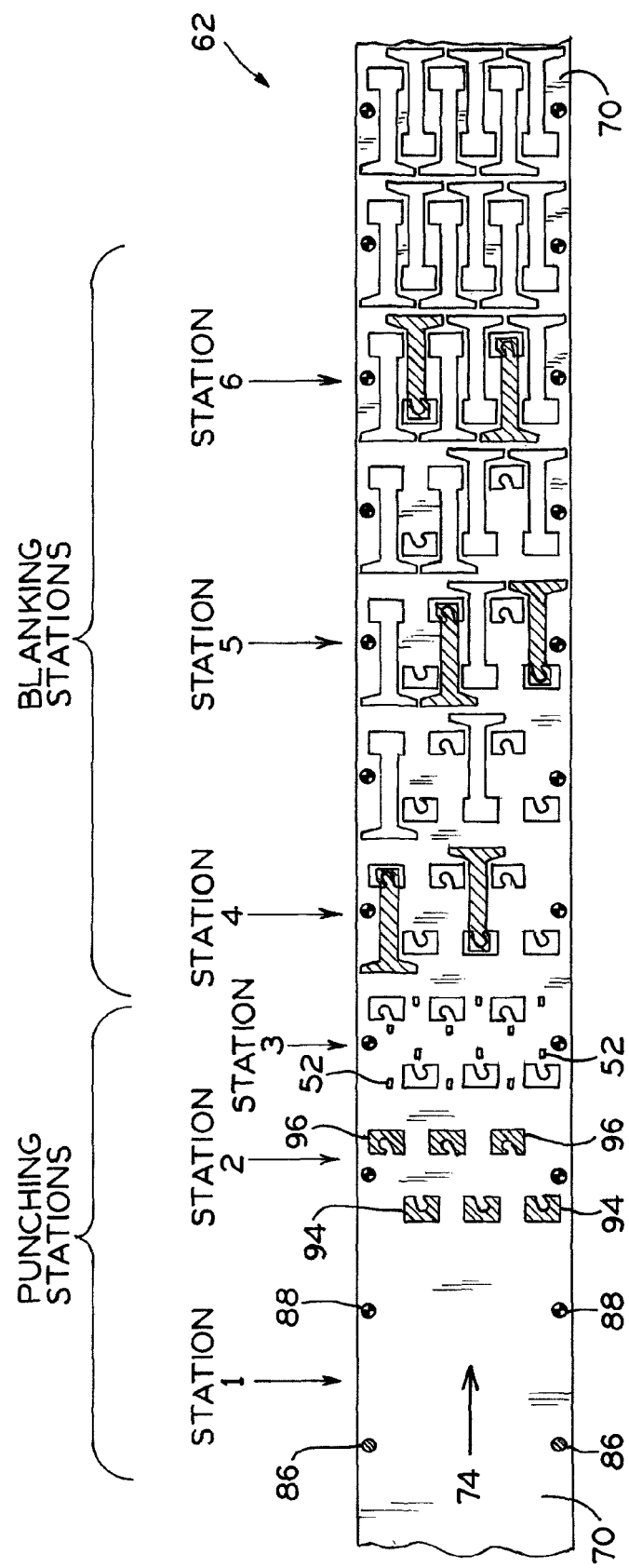
FIG. 6 is a strip layout of a first die assembly according to the present disclosure.
Figure 7:
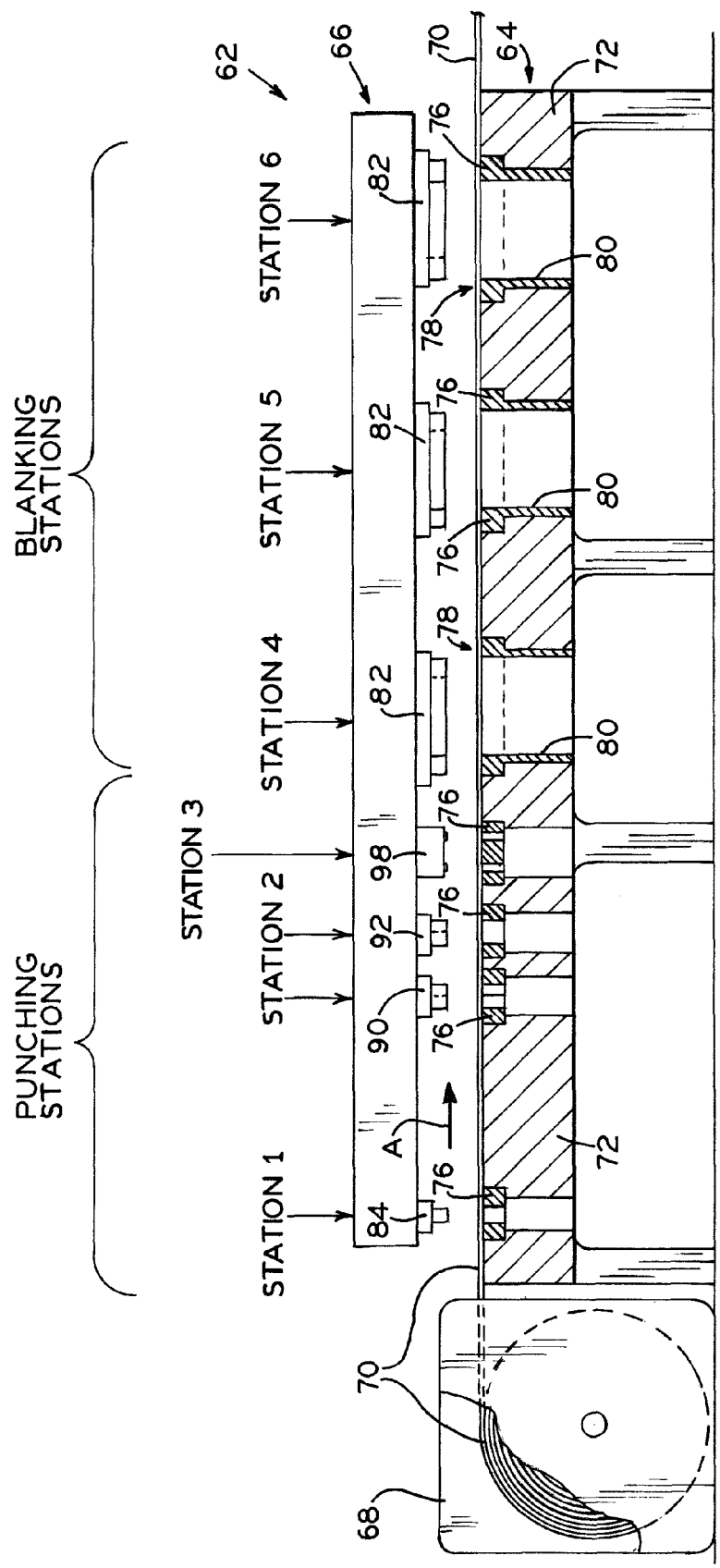
FIG. 7 is an elevational, partially sectioned view of the first die assembly, showing the lower die assembly, the upper die assembly, punch sets, choke cavities, and a stock material feeder for feeding a strip of stock material into the die assembly.

Referring to FIGS. 6 and 7, first die assembly 62 according to the present invention is shown. First die assembly 62 may be used to manufacture pole pieces from a strip of stock material, such as exemplary lamina or pole piece stacks 24, shown in FIGS. 1-3 and described above. Referring to FIG. 7, die assembly 62 generally includes lower die assembly 64 and upper die assembly 66. Die assembly 62 is installed within a press (not shown) and, in operation, the press reciprocates upper die assembly 66 upwardly and downwardly with respect to fixed lower die assembly 64 in a known manner.

Referring to FIG. 7, stock material feeder 68 is used with die assembly 62 to feed a strip of stock material 70 between lower die assembly 64 and upper die assembly 66. As described below, individual laminas 26 are shaped, formed, and blanked from strip 70, and are also stacked and interlocked within die assembly 62 to form pole pieces 24. Strip 70 of the stock material is typically mounted within feeder 68 in the form of a coil, and feeder 68 is operable to feed strip 70 of stock material from the coil into die assembly 62 along the direction of arrow A shown in FIG. 7. Lower die assembly 64 includes lower die bed 72 and may include a set of guide rails (not shown) for guiding strip 70 of stock material through die assembly 62. The guide rails may define feed pathway 74 (FIG. 6) that extends through die assembly 62 along a corresponding feed direction along which strip 70 of stock material is fed.

Lower die bed 72 of lower die assembly 64 includes a plurality of carbide die inserts 76 in operative alignment with the various punches of upper die assembly 66 for punching pilot holes and lamina features in strip 70 in the manner described below. Lower die assembly 64 additionally includes choke assemblies 78 each including a choke cavity 80 at blanking stations 4-6 of die assembly 62, which are adapted to receive laminas blanked from strip 70, as described below. Upper die assembly 66 includes a punch set corresponding to, and aligned along, feed pathway 74, which includes individual punches which cooperate with die inserts 76 of lower die assembly 64 to punch lamina features in strip 70, including blanking punches 82 at blanking Stations 4-6 of die assembly 62 for blanking, or separating, individual laminas from strip 70.

Referring to FIGS. 6 and 7, lower and upper die assemblies 64 and 66 include a plurality of die stations along feed pathway 74 at which pilot holes and lamina features are punched in strip 70 of stock material. A pair of pilot hole punches 84 (FIG. 7) of upper die assembly 66 initially punch pilot holes 86 (FIG. 6) on opposite sides of strip 70 at Station 1, which pilot holes are engaged by pilot pins 88 of upper die assembly 66 at various locations throughout die assembly 62 to align and locate strip 70 at each station while other punches of the punch sets are performing stamping, forming, and/or blanking operations on strip 70. At Station 2, a pair of punches 90 and 92 of upper die assembly 66 punch identical first and second sets 94 and 96 of three punched portions that are internally profiled to shape the distal protruding end portion 44 of a lamina as described above. The first set of three punched portions is staggered along the width of strip 70 and face in an opposite direction from an opposing or adjacent second set of three punched portions to allow nesting of the laminas for material conservation.

At Station 3, a plurality of staking punches 98 stake interlock tabs 52 in strip 70 with interlock tabs 52 formed in each lamina 26 except bottom lamina 26 in pole piece 24, as described above. Staking punches 98 of Station 3 may be selectively actuable, as described in above incorporated U.S. Pat. No. 7,676,906. For example, a cam assembly (not shown) regulates the downward movement of punches 98, allowing punches 98 to function in both a staking manner, in which punches 98 create interlock tabs 52 which are not separated from the laminas, and in an intermittently actuable manner to allow a greater downward movement of punches 98 to form apertures 60 of a bottom lamina 26.

At Stations 4-6, blanking punches 82 respectively separate individual laminas from strip 70 while concurrently transferring the same into respective choke cavities 80 and interlocking the blanked lamina with the next, adjacent lower lamina in choke cavities 80 in a process similar to that described in above incorporated U.S. Pat. No. 6,745,458 to Neuenschwander. Blanking punches 82 also shape the remainder of the profile of laminas 26, as described above.

Each of Stations 4-6 blank a pair of laminas, with the Stations 4-6 longitudinally separated along the die and the laminas nested as shown with respect to the strip in order to prevent excessive waste of the strip stock material.

Figure 4:
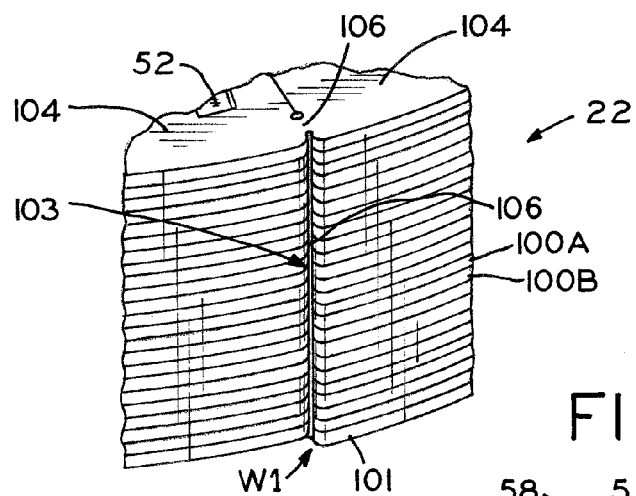
FIG. 4 is a fragmentary view of a portion of the core of FIG. 1.
Figure 5:
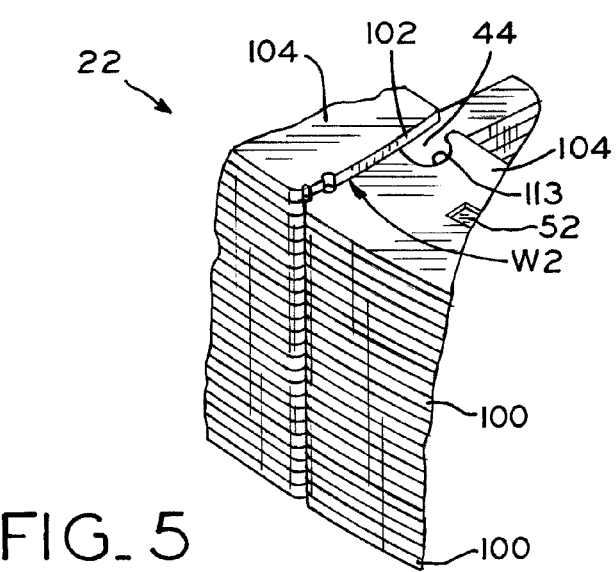
FIG. 5 is a fragmentary view of another portion of the core of FIG. 1.

Referring to FIGS. 1, 4, and 5, core 22 is assembled about the pole pieces 24 to form annular laminated article 20 in the manner described below. FIG. 4 illustrates a fragmentary view of a portion of core 22, showing individual layers 100A and 100B of a continuous strip 100 of material that forms core 22. Ends 101 and 102 of the strip are shown in FIGS. 4 and 5, respectively, and may be secured to strip 100 by welding, as described below.

Figure 9:
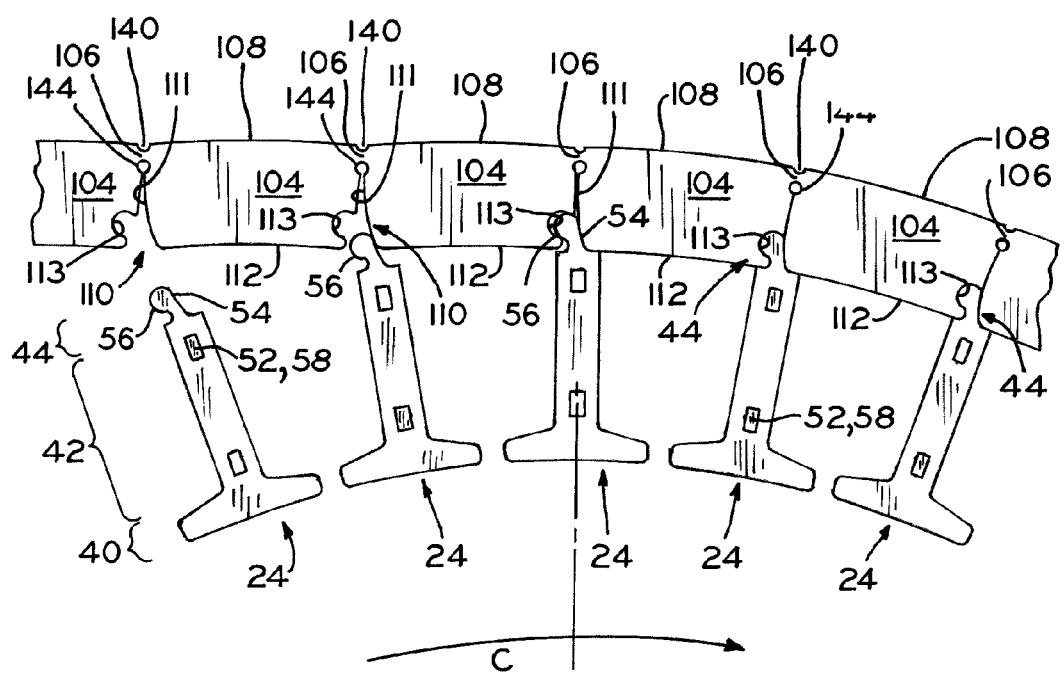
FIG. 9 is a fragmentary view showing the progressive reception of pole pieces into the gaps of the body segments of the strip of FIG. 8.

Referring to FIGS. 4, 5, and 9, strip 100 of core 22 includes body segments 104. Body segments 104 each include a slightly curved exterior surface 108 (FIG. 9). Body segments 104 are connected via hinge portions 106 defined between, and disposed adjacent, exterior surfaces 108 of adjacent body segments 104. Body segments 104 each further include a correspondingly curved interior surface 112. Body segments 104 are separated by gaps 110 which generally include relief portions 111 adjacent hinge portions 106, and recesses 113 adjacent interior surfaces 112 of adjacent body segments 104. Recesses 113 are shaped complimentary to distal protruding ends 44 of pole pieces 24, and ends 44 of pole pieces 24 are captured within recesses 113 as described below.

Figure 8:
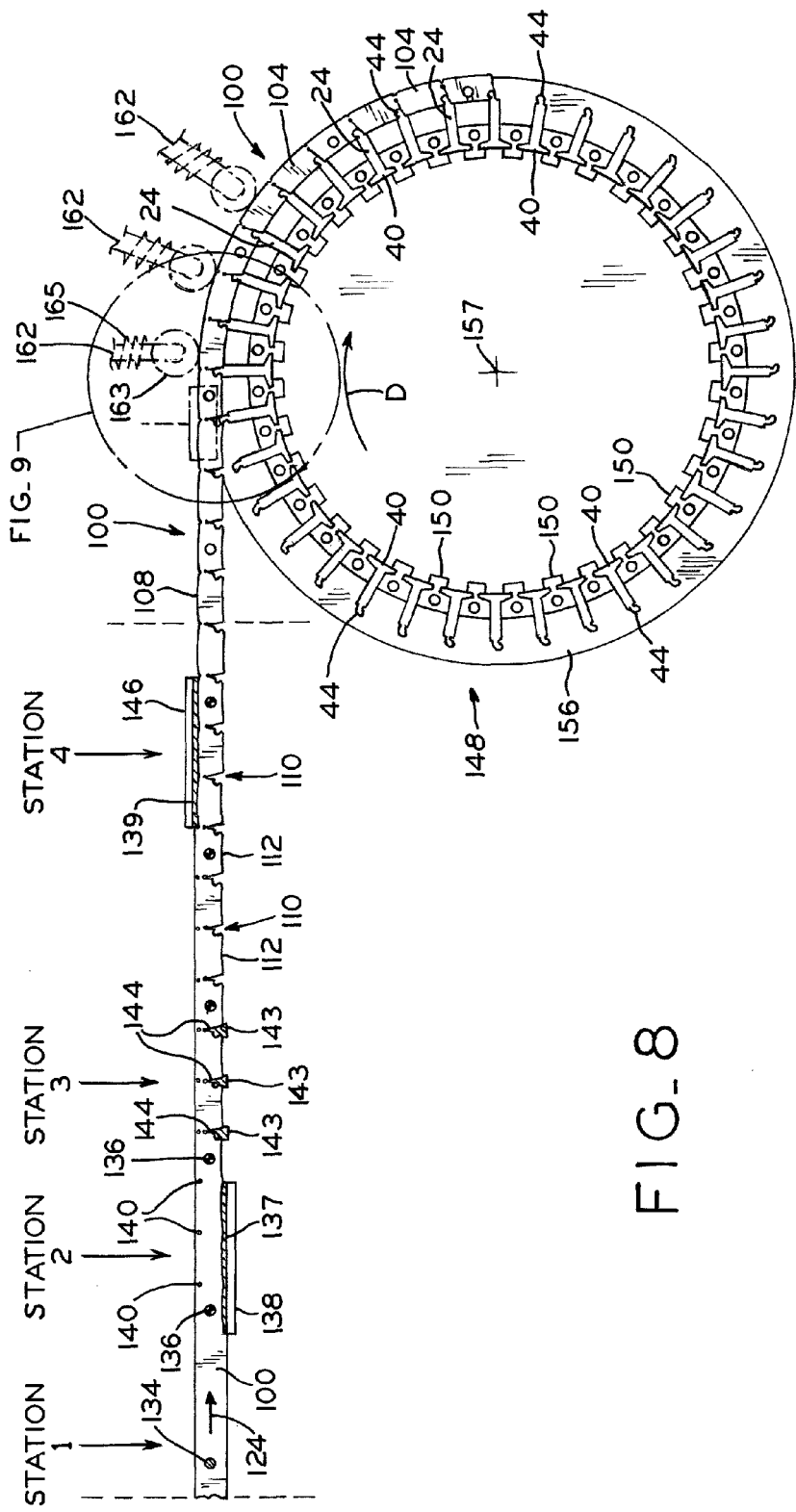
FIG. 8 is a strip layout of a second die assembly according to the present disclosure, also showing a rotary carousel configuration including the pole pieces of FIG. 1, about which the strip formed by the second die assembly is wound upon rotation of the rotary carousel assembly.
Figure 10:
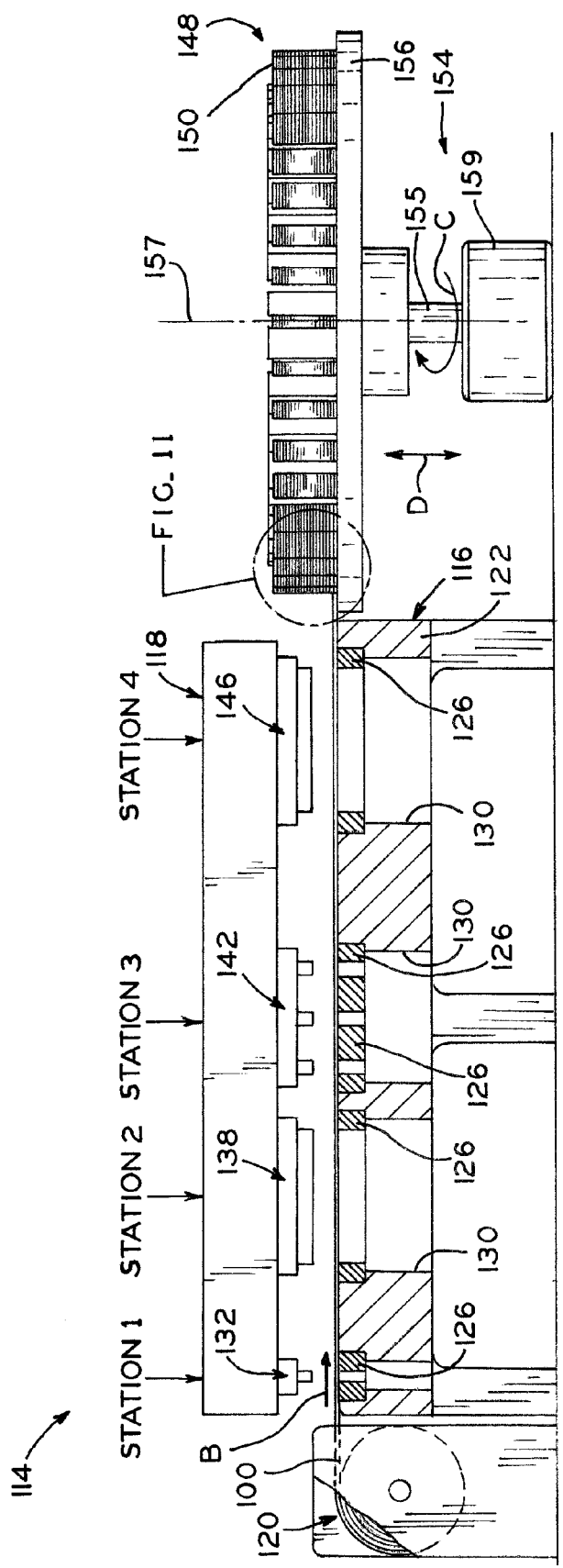
FIG. 10 is an elevational, partially sectioned view of the second die assembly, showing the lower die assembly, the upper die assembly, punch sets, choke cavities, and a stock material feeder for feeding a strip of stock material into the die assembly, along with the rotary carousel assembly.

Referring to FIGS. 8 and 10, second die assembly 114 is shown, which is used to manufacture strip 100 of core 22 shown in FIGS. 1, 4, 5, and 9 and described above. Referring to FIG. 10, die assembly 114 generally includes lower die assembly 116 and upper die assembly 118. Die assembly 114 is installed within a press (not shown) and, in operation, the press reciprocates upper die assembly 118 upwardly and downwardly with respect to fixed lower die assembly 116 in a known manner. As disclosed herein, die assembly 114 is "different" from die assembly 62 to the extent that die assembly 114 is configured to produce strip 100 while die assembly 62 is configured to produce pole pieces 24. Typically, die assemblies 114 and 62 will also be physically separate from one another and operated by different presses, though it is contemplated that die assemblies 114 and 62 could also be different from one another in the manner described above, i.e., designed to produce different parts, and yet integrated into a single overall die assembly operated by a single press and having separate material stock feeding devices for strips 70 and 100.

Referring to FIG. 10, stock material feeder 120 is used with die assembly 114 to feed a strip of stock material 100 between lower die assembly 116 and upper die assembly 118. Strip 100 of the stock material is typically mounted within feeder 120 in the form of a coil, and feeder 120 is operable to feed strip 100 of stock material from the coil into die assembly 114 along the direction of arrow B shown in FIG. 10. Lower die assembly 116 includes lower die bed 122 and may include a set of guide rails (not shown) for guiding strip 100 of stock material through die assembly 114. The guide rails may define feed pathway 124 (FIG. 8) that extends through die assembly 114 through which strip 100 of stock material is fed along a corresponding feed direction.

Lower die bed 122 of lower die assembly 116 includes a plurality of carbide die inserts 126 in operative alignment with the various punches of upper die assembly 118 for punching pilot holes and blanks in strip 100 in the manner described below. Lower die assembly 116 additionally includes waste cavities 130 at Stations 1-4 of die assembly 114, which are adapted to receive the waste of strip portions blanked from strip 100, as described below. Upper die assembly 118 includes a punch set corresponding to, and aligned along, feed pathway 124, which includes individual punches which cooperate with die inserts 126 of lower die assembly 116 to punch features in strip 100.

Referring to FIGS. 8 and 10, lower and upper die assemblies 116 and 118 (FIG. 10) include a plurality of die stations along feed pathway 124 (FIG. 8) at which pilot holes and lamina features are punched in strip 100 of stock material, and in which features are formed in strip 100. Pilot hole punch 132 (FIG. 10) of upper die assembly 118 initially punches pilot hole 134 in strip 100 at Station 1, which pilot hole is engaged by pilot pins 136 of upper die assembly 118 at various locations throughout die assembly 114 to align and locate strip 100 at each station while other punches of the punch sets are performing stamping, forming, and/or blanking operations on strip 100.

At Station 2, a first elongated punch 138 of upper die assembly 118 (FIG. 10) punches a first elongated portion 137 (FIG. 8) from one side of strip 100 to define interior surfaces 112 of body segments 104 as well as a set of three equally spaced first relief holes 140 (FIG. 8). At Station 3, a set of three punches 142 (FIG. 10) remove portions 143 (FIG. 8) of strip 100 to form gaps 110 and recesses 113 that are correspondingly shaped to the profile of distal protruding end portion 44 of pole piece 24, with the removed portions terminating in second relief holes 144 (FIG. 9) disposed proximate first relief holes 140. At Station 4, second elongated punch 146 (FIG. 10) of upper die assembly 118 punches a second elongate portion 139 (FIG. 8) from a side of strip 100 opposite from the side punched by first elongated punch 138 to define exterior surfaces 108 of body segments 104. The second elongated punch 146 also removes material around first relief holes 140 to provide a semi-circular shape for reliefs 140 as may be seen in FIG. 9 and which, together with second relief holes 144, define hinge portions 106 between body segments 104.

Advantageously, by forming a core strip separately from the pole pieces for later combination with the pre-formed pole pieces, stock material used to form the large diameter annular component is greatly conserved to prevent excessive waste of the material. Also, die assembly 114 produces a continuous strip 100 with minimal waste of material which, as described in detail below, is wound about a rotary carousel as strip 100 is advanced from die assembly 114 to form core 22 of laminated article 20 in a continuous manner.

In one embodiment, pole pieces 24 and core strip 100 are made of the same material, such as stainless steel or any low or high grade electrical steel. In other embodiments, pole pieces 24 and core strip 100 may be formed of different materials, depending upon the magnetic properties desired for the annular article. For example, pole pieces 24 may be formed of a high grade electrical steel while core strip 100 is made of a low grade electrical steel, or vice-versa, for cost reduction. In other embodiments, pole pieces 24 of any given annular article may be formed of different materials, or may have differing shapes. In this manner, because pole pieces 24 and core strip 100 are initially formed separately from one another using different dies in the present method, these components may be selectively tailored with respect to one another as to materials and/or shape as desired.

FIGS. 10 and 11 illustrate rotary carousel 148, which includes base assembly 154 including rotary shaft 155 and actuator unit 159. Base plate 156 is mounted to shaft 155, and shaft 155 and carousel 148 are rotatable about axis 157, as indicated by arrow C in FIG. 10. Axis 157, as shown in FIGS. 1, 8, 10, and 12, is also the central longitudinal axis of core 22. Actuator unit 159 (FIG. 10), which may include one or more electric motors or other drive devices, rotates shaft 155 and carousel 148 about axis 157, and also indexes base plate 156 upwardly and/or downwardly along the direction indicated by arrow D of FIG. 10 to lower base plate 156 as strip 100 is fed onto rotary carousel 148 layer by layer, as described below. Actuator unit 159 may include a motor which operates either to continuously rotate shaft 155 and base plate 156 of carousel 148 in a manner which is timed with the advancement of strip 100 from die assembly 114, or such a motor may operate in a stepped fashion which is coordinated with the reciprocation of die assembly 114. In either embodiment, the operation of die assembly 114, and thus the rate of advancement of strip 100, is timed to coincide with the rotation of carousel 148 so that strip 100 is fed onto, and wound around, carousel 148 layer by layer.

FIG. 11 illustrates a fragmentary view of a portion of rotary carousel 148, showing base plate 156, which includes a plurality of locating blocks 150 secured to base plate 156 by bolts 158. Locating blocks 150 define spaces therebetween which are dimensioned for receipt of pole pieces 24. Pole pieces 24 are positioned within the spaces between locating blocks by hand, or may be automatically placed by a mechanical placement device (not shown). Proximal end portions 40 of pole pieces 24 are positioned towards an interior of carousel 148, and distal protruding end portions 44 of pole pieces 24 are positioned toward an exterior of carousel 148, and protrude outwardly of locating blocks 150 for receipt of strip 100 as described below.

After strip 100 is formed by the process described above, strip 100 continues along a path in which it is wound about rotary carousel 148, and strip 100 typically will have a thickness that is substantially similar to a thickness of each individual lamination of pole pieces 24. In other embodiments, the thickness of strip 100 may differ from the thickness of the individual laminations of pole pieces 24.

Referring to FIGS. 8 and 9, concurrent with the operation of second die assembly 114 and advancement of strip 100 therefrom, carousel 148 is rotated by actuation device 159 (FIG. 10) to wind strip 100 about the exterior of carousel 148. Guide rollers 162, shown in FIG. 8 in the form of spring-tensioned contact roller devices including roller members 163 and springs 165, for example, may engage the outer periphery 108 of body segments 104 of strip 100 to aid in holding strip 100 in position and preventing strip 100 from initially detaching from distal end portions 44 of pole pieces 24. In particular, guide rollers 162 may be used to guide the initial feeding of strip 100 onto pole pieces 24 when strip 100 is first advanced from die assembly 114 onto carousel 148.

Referring to FIG. 9, the winding of strip 100 around pole pieces 24 of carousel 148 is shown, with the details of carousel 148 omitted for clarity to more clearly illustrate the progressive capturing of distal end portions 44 of pole pieces 24 within gaps 110 between body segments 104 of strip 100. As strip 100 is wound about carousel 148, body segments 104 close about hinge portions 106 and via gaps 110 to capture the correspondingly shaped distal end portions 44 of pole pieces 24 to secure pole pieces 24 to core 22 as core 22 is formed by progressively winding strip of 100 in a layer-by-layer manner around carousel 148 and pole pieces 24. In particular, relief holes 144 and 140, as well as relief portions 111 adjacent hinge portions 106, facilitate bending deformation of hinge portions 106 to allow recesses 113 to collapse about, and capture, distal end portions 44 of pole pieces 24 between adjacent body segments 104 of strip 100. Initially, for a given pole piece 24, a linear lead-in edge 54 of a lamina of end portion 44 of pole piece 24 engages a corresponding linear edge of a lamina of body segment 104, followed by recess 113 of a lamina of body segment 104 closing onto, and engaging, the hemispherical edge 56 of a lamina of pole piece 24. Thus, the convex profile of distal end portions 44 of pole pieces 24 conforms to the concave profile of recesses 113 and, in the embodiment shown in FIG. 9, allows a limited extent of relative rotational movement between distal end portions 44 of pole pieces 24 and body segments 104 as recesses 113 of body segments 104 progressively close onto distal end portions 44. As distal end portions 44 of pole pieces 24 are captured between body segments 104 of strip 100, with further rotation of carousel 148 and progression of this process more and more laminas 26 of pole pieces 24 are secured with respect to the layers of strip 100 as core 22 is formed.

Advantageously, the capture of distal end portions 44 of pole pieces 24 between body segments 104 of strip 100 allows carousel 148 to exert a pulling force on strip 100 as strip 100 is produced by die assembly 114. Thus, although the timing of operation of die assembly 114 and the formation of strip 100 by die assembly 114 is timed to correspond substantially to the take-up of strip 100 onto carousel 148 by the rotation of carousel 148, in one embodiment carousel 148 may be operated at a slightly increased rate to exert a pulling tension on strip 100.

After completion of each rotation of carousel 148 corresponding to formation of a layer of core 22, actuation device 159 (FIG. 10) indexes downwardly a distance equal to the thickness of strip 100. This allows the strip 100 to be advanced from die assembly 114 as shown in FIG. 10 at a substantially constant horizontal level. FIG. 12 shows a schematic, exaggerated view of the continuous helical strip 100 that forms core 22 as strip 100 winds about pole pieces 24 and carousel 148, about axis 157, until a number of layers of strip 100 are produced that is substantially equal to the number of laminations of each pole piece 24.

Referring to FIGS. 1, 4, and 5, after a suitable number of layers of strip 100 have been wound about carousel to form core 22, strip 100 is cut. Optionally, as shown in FIGS. 4 and 5, interlock tabs 52 may be formed in body segments 104 of layers of strip 100 by second die assembly 114. Such interlock tabs 52 may be separately interlocked during the winding of strip 100, for example, via staking punches that punch interlock tabs 52 into body segments 104 at periodic intervals in which the strip winding stops to allow for the staking punches to operate. For instance, the rotation of carousel 148 may be paused at the completion of each rotation of carousel to allow the staking to occur after each single layer of strip 100 is wound about carousel 148. In an alternative embodiment, interlock tabs 52 of body segments 104 are all interlocked by compression of core 22 via a press device (not shown), after a desired number of layers of strip 100 have been built up around pole pieces 24.

After strip 100 is cut, the ends of strip 100 are welded onto respective underlying or overlying layers of strip 100 to secure the ends of core 22. In particular, referring to FIGS. 4 and 5, the ends 101 and 102 of strip 100 may be secured to core by welding ends 101 and 102 to core 22 at respective welding locations W1 (FIG. 4) and W2 (FIG. 5). Similarly, the individual layers of strip 100 may be welded to one another along longitudinal welding points W3 (FIG. 4) defined along hinge portions 106 between adjacent body segments 104. Then, the completed core 22 may be removed from carousel 148 and subjected to desired finishing operations to form a stator, for example. After core 22 is removed, actuating device 159 indexes base plate 156 of carousel upwardly along the direction of arrow E of FIG. 10 to its initial position to allow the above-described process to be repeated to form another core 22.

Distal end portions 44 of pole pieces 24 in the embodiment described above have a profile defined by relatively straight wall 54 together with hemispherical wall 56. As described above, this shape, together with the correspondingly semicircular shape of recesses 113 provided within gaps 110 between adjacent body segments 104 of strip 100, allows distal end portions 44 of pole pieces 24 to be received and captured within recesses 113 and gaps 110 upon bending deformation of strip 104 about hinge portions 106 between adjacent body segments 104. However, the shape of distal end portions 44, as well as the corresponding profiles of gaps 110, may vary.

Figure 13A:
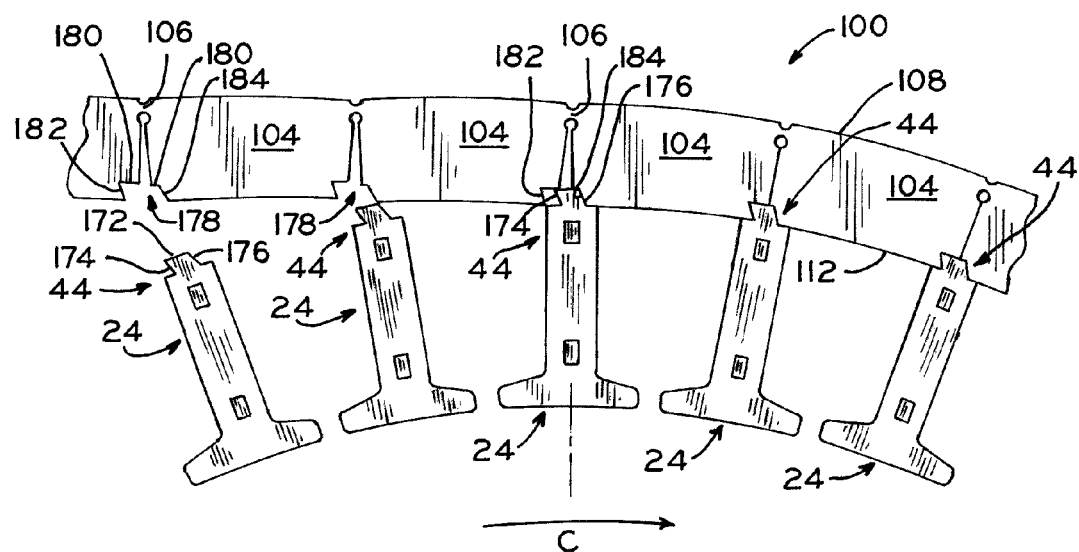
FIG. 13A is a fragmentary view showing the progressive reception of pole pieces into the gaps of the body segments of a strip, the pole pieces and body segments having an interface according to an alternative embodiment.
Figure 13B:
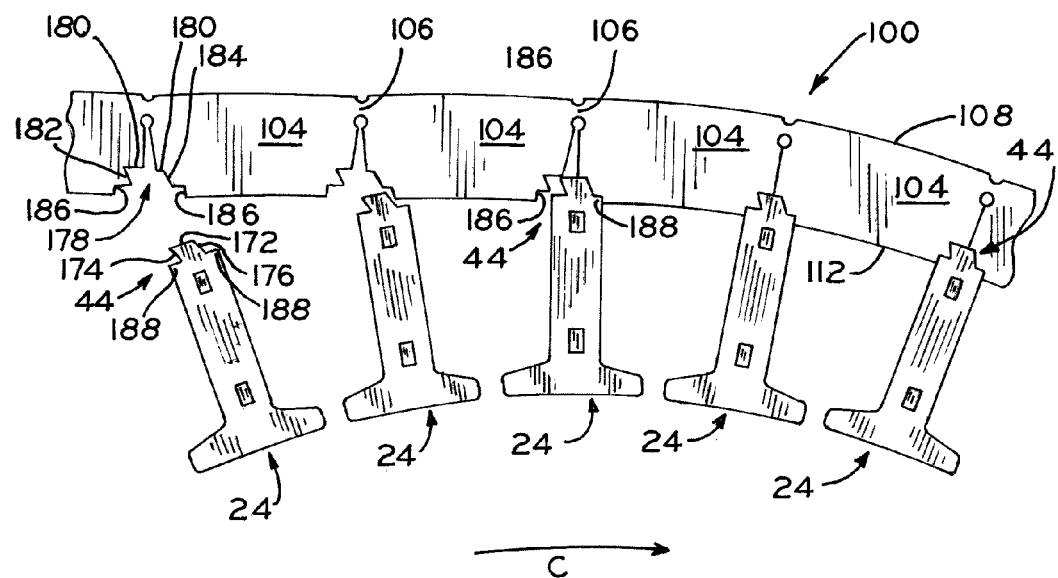
FIG. 13B is a fragmentary view showing the progressive reception of pole pieces into the gaps of the body segments of a strip, the pole pieces and body segments having an interface according to another alternative embodiment.

Referring to FIGS. 13A and 13B, alternative shapes or profiles for the distal end portions 44 of pole pieces 24 and corresponding features in strip 100 are shown. Referring to FIG. 13A, a half-dovetail interface is shown between pole piece 24 and strip 100, in which distal end portion 44 of pole piece 24 includes a half-dovetail projection 170 having a first, distal wall 172 normal to the longitudinal axis of pole piece 24, an first angled second dovetail or locking wall 174, and a third, angled lead-in wall 176. Strip 100 includes a corresponding dovetail recess 178 defined by first walls 180, a second angled dovetail or locking wall 182 in a first body segment 104, and a third, angled lead-in wall 184 in the adjacent body segment 104 of strip 100.

As shown in FIG. 13A, as strip 100 is wound about carousel 148 in the manner described in detail above with respect to the previous embodiment, body segments 104 of strip 100 close about hinge portions 106 with the third, lead-in walls 176 and 184 initially engaging one another, followed by engagement of first walls 172 and 180 and concluding with second walls 182 of body segments 104 closing about and engaging second walls 174 of distal end portions 44 of pole pieces 24 to capture distal end portions 44 of pole pieces 24 and secure pole pieces 24 to core 22. The half-dovetail engagement between angled second walls 174 and 182 of pole pieces 44 and body segments 104, respectively, firmly locks pole pieces 44 in place between body segments 104 of strip 100.

Referring to FIG. 13B, an alternative half-dovetail interface between pole piece 24 and strip 100 is shown, in which body segments 104 of strip 100 include additional recesses 186 which close about shoulder portions 188 of distal end portions 44 of pole pieces 24. In further embodiments, a full dovetail interface may be used between pole piece 24 and strip 100 to provide a still more rigid locking interface between the pole pieces 24 and core 22. Other types of interlocking interfaces between the pole pieces 24 and core 22 may be used.

Figure 17:
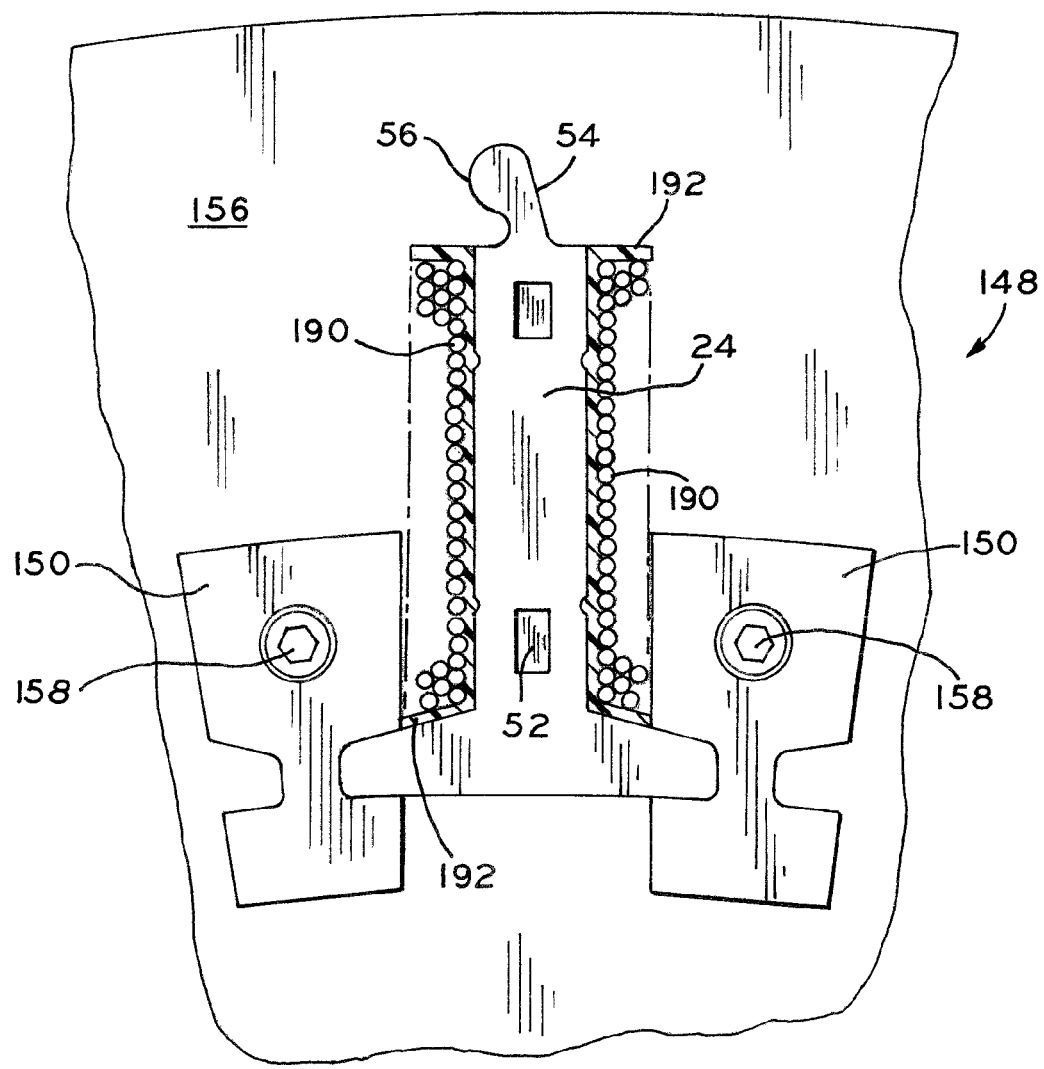
FIG. 17 is a fragmentary view of a portion of the rotary carousel, showing a pole piece and bobbin held between a pair of locating blocks of the carousel.

In further embodiments, shown in FIGS. 16A, 16B, and 17, electrical windings may be wound onto pole pieces 24 prior to loading of pole pieces 24 into carousel 148. Referring to FIG. 16A, electrical windings 190 may be would about bobbins 192, which may be made of an insulating material such as a plastic and shaped to fit over pole pieces 24. As shown in FIG. 16B, bobbins 192 may include recesses 194 to located the initial winding layer of windings 190 and thereby aid in the uniform winding of windings 190 about bobbins 192. Then, as shown in FIG. 17, pole pieces 24 with bobbins 192 may be loaded on to carousel 148 between pairs of locating blocks 150, followed by winding strip 100 around pole pieces 24 to form core 22 of article 20, as described above. In another embodiment, an insulation material (not shown) may be over-molded directly onto pole pieces 24 followed by winding windings 190 directly onto pole pieces 24 over the insulating layer. In this embodiment, pole pieces are "pre-wound" prior to formation of article 20, which may be advantageous in the event the particular geometry of core 22 and pole pieces 24 would make winding of pole pieces 24 difficult after formation of article 20.

In a further embodiment (not shown) carousel 148 may be configured such that multiple horizontal levels of sets of pole pieces 24 may be held by carousel 148, perhaps with spacer members (not shown) disposed between the individual pole piece layers. This configuration would allow several layers of pole pieces 24 to be loaded onto carousel 148 during a common loading operation, with several cores 22 formed respectively about the pole piece layers. Between each layer, strip 100 would be cut, carousel 148 would be vertically indexed, and strip 100 would be sequenced to and wound about a next level of pole pieces 24 to form a new article 20. In this manner, a number of annular laminated parts 20 may be formed via a continuous operation without having to remove each part 20 and re-load carousel 148 with pole pieces 24 after the formation of each annular laminated part 20.

Optionally, die assembly 114 may operate using a strip accumulator device (not shown), such that strip 100 is not wound about carousel 148 directly upon exiting die assembly 114. In such an embodiment, strip 100 is accumulated on the strip accumulator device, such as being wound around a rotary accumulator or being overlapped by a ribbon accumulator, before being would about carousel 148. The use of a strip accumulator device allows die assembly 114 to operate continuously even when carousel 148 is not itself operational to receive strip 100, such as when conducting welding operations on a completed core 22, during removal of a completed article 20 from carousel 148, and/or loading of carousel 148 with pole pieces 24.

Figure 14:
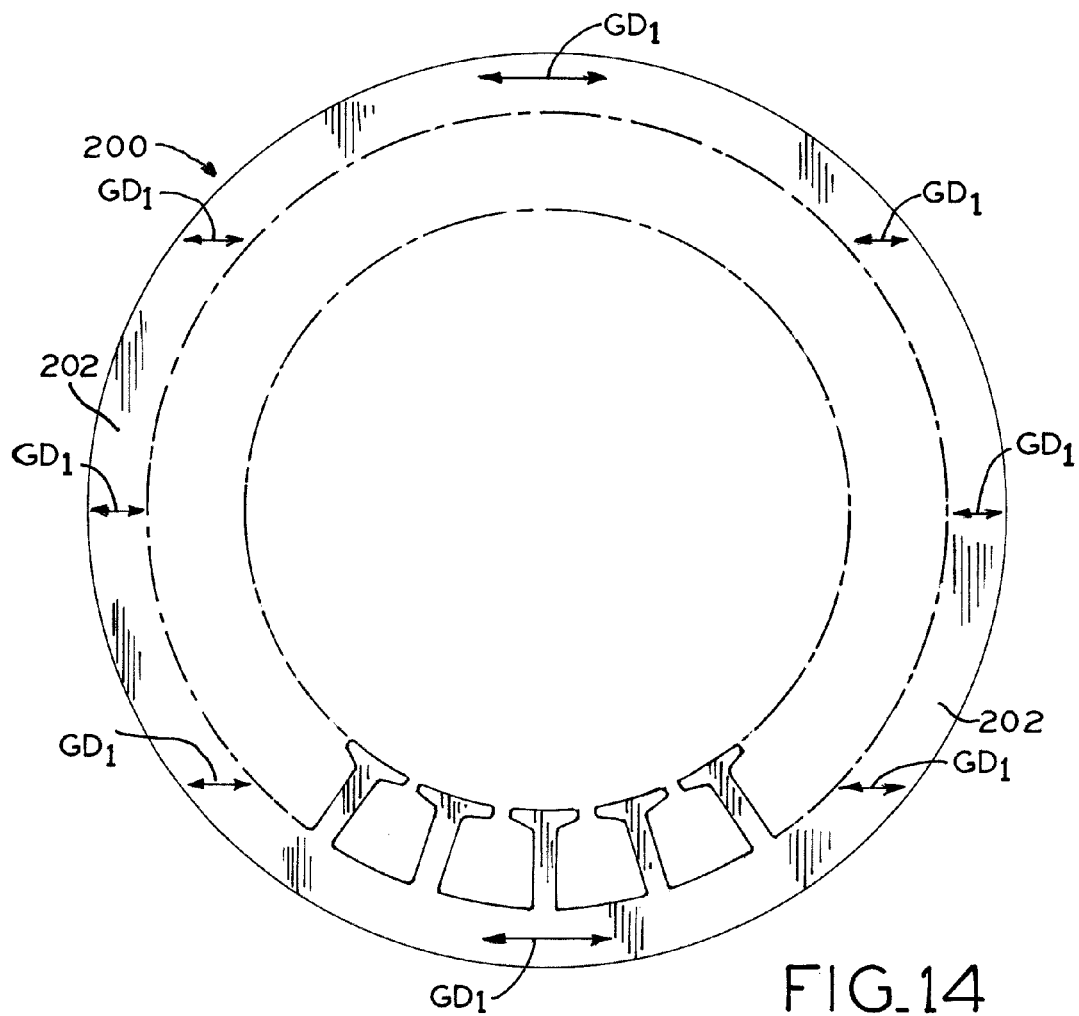
FIG. 14 is a view of a known annular laminated article formed as a stack of annular laminations.
Figure 15:
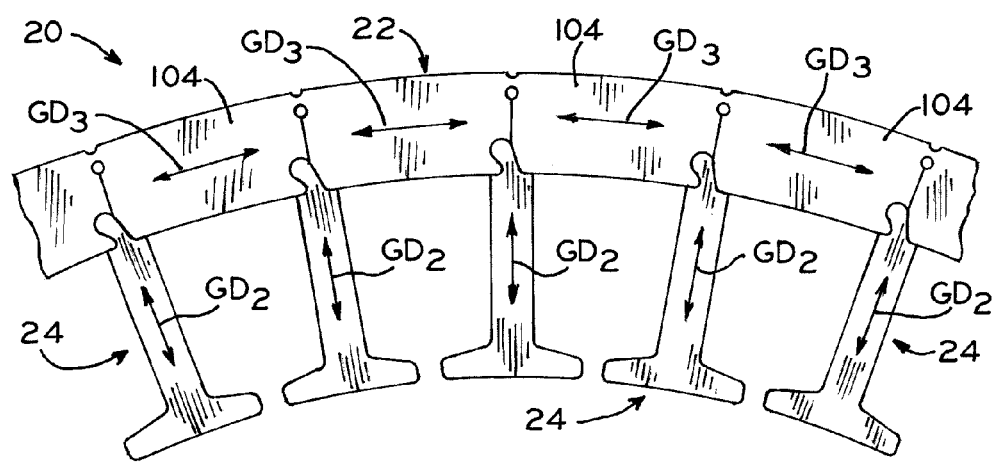
FIG. 15 is a fragmentary view of a portion of an annular laminated article manufactured by the present method.

Referring to FIGS. 14 and 15, a further advantage of manufacturing annular laminated articles 20 by the present method involves the ability to selectively tailor and align the grain direction of the metal within a given laminated article 20. As shown in FIG. 14 in connection with prior methods in which annular articles 200 are formed from a stack of annular laminas 202 that are each stamped as a single, annular piece from a strip of material, the grain of each annular lamina 202 will be representative of the grain of the strip of material from which the laminas 202 are stamped. Typically, strips of metal stock material will have a grain direction extending parallel to, and along, the strip itself. Thus, referring to FIG. 14, the grain direction in any given lamina 202 will be unidirectional throughout the lamina 202, as illustrated by grain direction arrows $GD_1$.

However, as described in detail above, laminated articles 20 manufactured via the present method may be manufactured using two or more different die assemblies, and include a core 22 and pole pieces 24 which may be formed from different strips of stock material. Referring to FIG. 15, if the strips of stock material from which core 22 and pole pieces 24 are formed each have a grain direction extending parallel to, and along, the strips of stock material, the core 22 and pole pieces 24 of the resulting article 20 will have differing grain directions. In particular, the pole pieces 24 will have grain directions extending along arrows $GD_2$ along the longitudinal axes of pole pieces 24 and which, in the resulting article 20, will each extend radially similar to the spokes of a wheel. Body segments 104 of core 22 will have grain directions extending along arrows $GD_3$ generally parallel to the interior and exterior edges of body segments 104 such that core 22 will have a grain direction resulting from its combined body segments 104 that extends around the annular periphery of core 22 and approximates a circle with respect to a given layer of core 22, or a helix with respect to the multiple layers of core 22. However, use of strips of stock material having differing grain directions and/or stamping pole pieces 24 in selected differing orientations with respect to the grain direction of the strip of stock material from which pole pieces 24 are stamped allows the grain directions within any given article to be selectively tailored to in turn tailor and/or enhance the magnetic properties of the article.

While this invention has been described as having an exemplary design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of forming an annular article, comprising the steps of:
    forming a plurality of pole pieces by forming, stacking, and interlocking a plurality of individual laminations in a first die assembly;
    loading the plurality of pole pieces onto a rotary carousel;
    forming a continuous strip in a second die assembly, the continuous strip including a plurality of body segments separated by gaps, the body segments connected via hinge portions; and
    rotating the carousel with concurrent winding of the strip around the carousel to progressively capture distal ends of the pole pieces within the gaps by pivoting the body segments about the hinge portions.

2. The method of claim 1, wherein said step of forming a continuous strip occurs concurrently with said step of rotating the carousel.

3. The method of claim 1, further comprising, after said step of rotating the carousel, the additional step of:
    repeating said step of rotating the carousel throughout a plurality of rotations to helically wind the strip around the carousel and progressively build helical layers of the strip around the pole pieces.

4. The method of claim 3, further comprising the additional step of vertically indexing the carousel with each rotation of the carousel.

5. The method of claim 1, wherein said step of rotating the carousel further comprises vertically indexing the carousel.

6. The method of claim 1, wherein said step of rotating the carousel further comprises capturing a convex profile of the distal ends of the pole pieces within a concave profile of the gaps.

7. The method of claim 1, further comprising, after said rotating the carousel step, the additional steps of:
    cutting the strip; and
    securing ends of the strip to the body segments.

8. The method of claim 1, further comprising, prior to said loading step, the additional step of:
    providing electrical windings about the pole pieces.

* * * * *